(12) United States Patent
Tak et al.

(10) Patent No.: US 6,567,460 B1
(45) Date of Patent: May 20, 2003

(54) DEVICE AND METHOD FOR DETECTING PILOT PN OFFSET IN CORDLESS TELEPHONE SYSTEM

(75) Inventors: Yong Sang Tak, Kyungki-do (KR); Dae Hyun Kim, Kyungki-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/072,352

(22) Filed: May 5, 1998

(30) Foreign Application Priority Data

May 15, 1997 (KR) .............................. 97-18809

(51) Int. Cl.[7] .......................... H04B 1/704; H04Q 7/20
(52) U.S. Cl. ..................... 375/140; 375/149; 455/422; 455/434
(58) Field of Search ................................. 375/130, 140, 375/142, 143, 145, 147, 149, 150, 152, 367; 370/320, 335, 342, 441, 503, 509, 515; 379/185; 455/422, 462, 463, 434, 552

(56) References Cited

U.S. PATENT DOCUMENTS

| 5,790,589 A | * | 8/1998 | Hutchison, IV et al. ..... 375/130 |
| 5,950,131 A | * | 9/1999 | Vilmur ........................ 455/434 |
| 6,064,691 A | * | 5/2000 | Banister et al. ............. 375/149 |

* cited by examiner

Primary Examiner—Betsy L. Deppe
(74) Attorney, Agent, or Firm—Fleshner & Kim, LLP

(57) ABSTRACT

A device and method for detecting a pilot PN offset in a cordless telephone system is disclosed. The device and method can detect all pilot PN offsets within a service region of the home station for detecting and providing a pilot PN offset which are not in use by other subscribers to its own handset. A controlling part determines different pilot PN offsets existing in an overlapped service region using pilot PN offsets stored in a storage region and energy values of the PN offsets to detect a pilot PN offset not in use, thus providing an optimal pilot channel signal to the cordless telephone system.

22 Claims, 4 Drawing Sheets

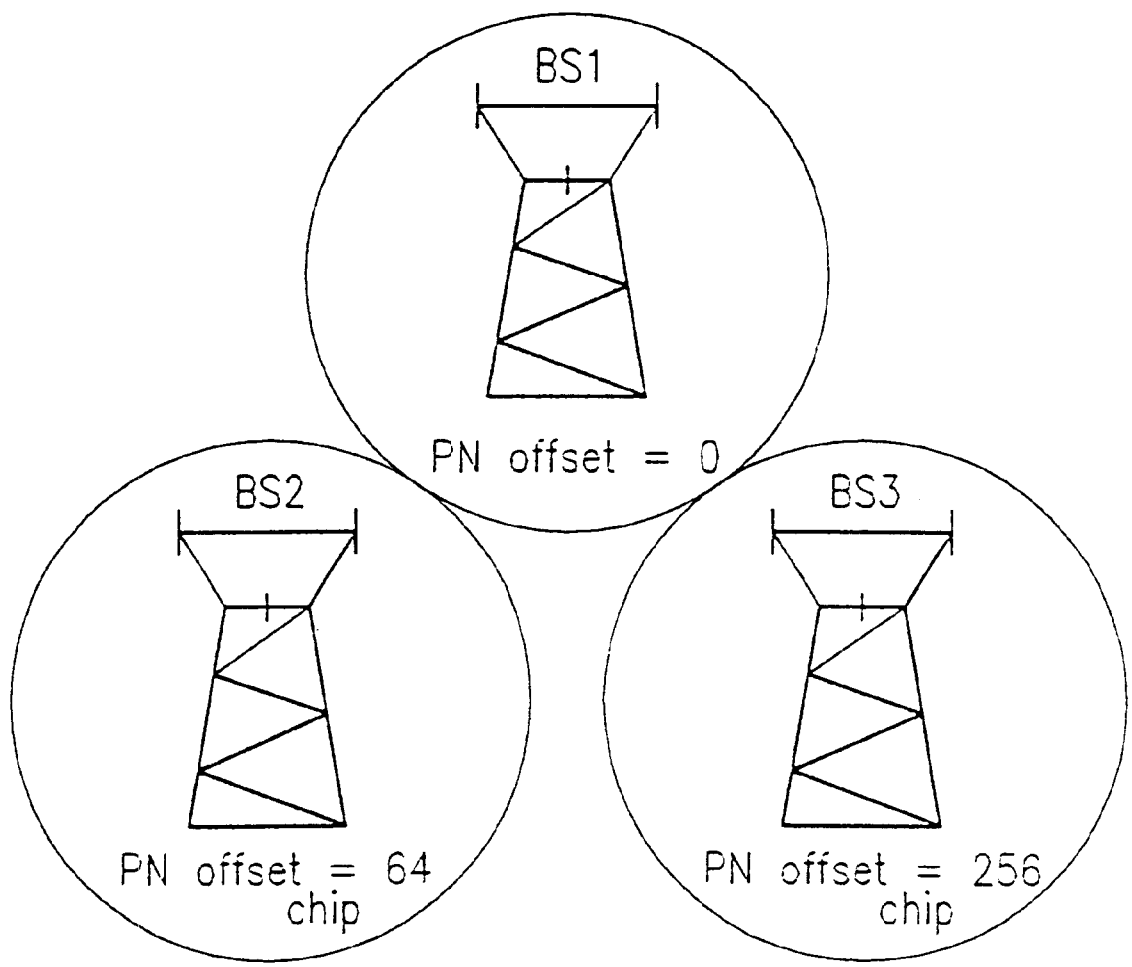

DEVICE AND METHOD FOR DETECTING PILOT PN OFFSET IN CORDLESS TELEPHONE SYSTEM

BACKGROUND OF THE INVENTION

1. Field of the Invention

The present invention relates to device and method for detecting a pilot PN (Pseudo-Noise) offset in a cordless telephone system, and more particularly, to device and method for detecting a pilot PN offset in a cordless telephone system having a cellular handset and a home station connected to PSTN (Public Switching Telephone Network), which can detect all pilot PN offsets within a service region of the home station for detecting a pilot PN offset which are not in use by other subscribers.

2. Description of the Related Arts

In general, the cordless telephone system, operative within a frequency band of 800~900 MHz, is provided with a handset for talking thereto and hearing therefrom and a home station for charging the handset when the handset is placed thereon and offering pre-programmed additional services. The home station in general is stationed at a certain place for power supply and connected to PSTN. In transmission of a signal using such a cordless telephone system, the signal is transmitted from the handset to the PSTN through the home station. Opposite to this, in reception of a signal using such a cordless telephone system, the signal received from the PSTN is transmitted to the handset through the home station. In a background art cordless telephone system, there should be a channel of a certain frequency set-up between the home station and the handset in the cordless telephone system for either calling a subscriber or receiving a call from a subscriber using the handset.

The channel is set-up in the background art cordless telephone system according to the following steps.

A controlling part in the cordless telephone system determines the present mode if a standby condition is established by a power supply to the cordless telephone system. If the present mode is either a reception or transmission mode, one channel from preset plurality of channels is locked in the order of a preset sequence, and a RSSI (Received Signal Strength Indicator) of the locked channel is detected. If the detected RSSI is below a preset level, the channel is determined to be a channel none of subscribers around the home station is using at the moment, and either the transmission or reception mode is carried out through the locked channel. On the other hand, if the detected RSSI is above the preset level, determining that the channel being of a channel one of the subscribers around the home station is using at the moment, the next channel is locked, and the aforementioned process is repeated in succession. If the RSSIs detected from all the channels in the preset frequency band are above the preset level, which indicates that all the channels are occupied by other subscribers around the home station, the fact is informed to the handset of caller. However, the background art cordless telephone system has a problem in that the system reacts so sensitively to interferences of electromagnetic waves generated in electronic appliances around the home station as to determine that channels that are not used by other subscribers are misunderstood as being used by the other subscribers, which provide only limited channels to the home station. Under such a situation, if plural subscribers around the background art cordless telephone system try calling within the same time band, a subscriber trying relatively later within the time band may not have a channel assigned to the subscriber. Further, there may be crosstalk during use because of a misunderstanding that a channel in use actually is considered not in use due to the electromagnetic interference.

Another problem in the background art cordless telephone system is that a number of the channels available for being set up between the home station and handset is limited because of its frequency division multiple access system. Therefore, the aforementioned problems may occur more frequently in cases when many offices are present on the same floor of a building, or depending on locations and service areas of the home stations of the cordless telephone system in apartments. In order to overcome such problems of the background art cordless telephone system, one suggestion is application of a cellular network of a CDMA system between the home stations and the handsets in the cordless telephone system. In other words, the handset is used as a mobile station in a cellular mobile communication system, and the home station is made to serve as a base station. However, such a suggestion has the following problems. As shown FIG. 1A, in designing a cellular mobile communication system, a PN sequence synchronous to a GPS (Global Positioning System) time, a standard time, is divided into specific intervals (PN offset=0, 64, or 256) and the PN offsets of the PN sequence are assigned to the base stations such that the PN offsets are not overlapped between adjacent stations for distinguishing base stations BS1, BS2 and BS3 and their stations from one another. However, the same principle cannot be applied to the home station of a cordless telephone system because the system has been wide spread, which causes cases when the PN offsets are overlapped when many offices are present on the same floor in a building or depending on locations of the home stations in places like an apartment. That is, as shown in FIG. 1B illustrating an example of pilot PN offsets for home stations in a cordless telephone system, service regions may be overlapped between a few home stations HS1, HS2 and HS3 as well as the pilot offsets (for example, PN offset=0, 64, 256) used.

SUMMARY OF THE INVENTION

Accordingly, the present invention is directed to device and method for detecting pilot PN offsets in a cordless telephone system that substantially obviates one or more of the problems due to limitations and disadvantages of the related art.

An object of the present invention is to provide device and method for detecting a pilot PN offset in a cordless telephone system, in which all pilot PN offsets within a service region of the home station can be detected for a detecting pilot PN offset which are not in use by other subscribers and providing the detected pilot PN offset to a respective handset.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for detecting a pilot PN offset in a cordless telephone system includes pilot PN sequence generators each for generating a pilot PN sequence for tracking a synchronization of a pilot channel signal for itself, despreaders for despreading the pilot PN sequences provided from the pilot PN sequence generators and channel data signals detected within an overlapped service radius to one another, an accumulator for accumulating datastreams of pilot channels provided from the despreaders for a certain period, an energy value calculator for calculating an energy value of a signal from the accumulator for turned on time and delayed time, a storage region for storing at least one different pilot PN offsets detected within a set service region and threshold values of energy values, and a controlling part for determining different pilot PN offsets existing in an overlapped service region using the pilot PN offsets stored in the storage region and energy values of the PN offsets, detecting a pilot PN offset not in use, and providing an optimal pilot channel signal. In a preferred embodiment, the storage region comprises at least one register and storage area.

In other aspect of the present invention, there is provided a method for detecting a pilot PN offset in a cordless telephone system, including the steps of initializing a storage region, measuring an energy value of a pilot channel signal for one reference offset, obtaining all different pilot PN offsets detected within an overlapped service radius, comparing measured energy values to a threshold value of the energy values of the PN offsets in a predetermined sequence, constructing a database using a present pilot PN offset and the energy value of the present pilot PN offset in case the measured energy value exceeds the threshold value of the energy value of the PN offset, and selecting one of pilot PN offsets which are not included in the database when it is determined that the comparing step has been completed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 1A illustrates an assignment of pilot channel PN offsets in a background art cellular/personal communication network;

DETAILED DESCRIPTION OF THE PREFERRED EMBODIMENT

Figure 1B:
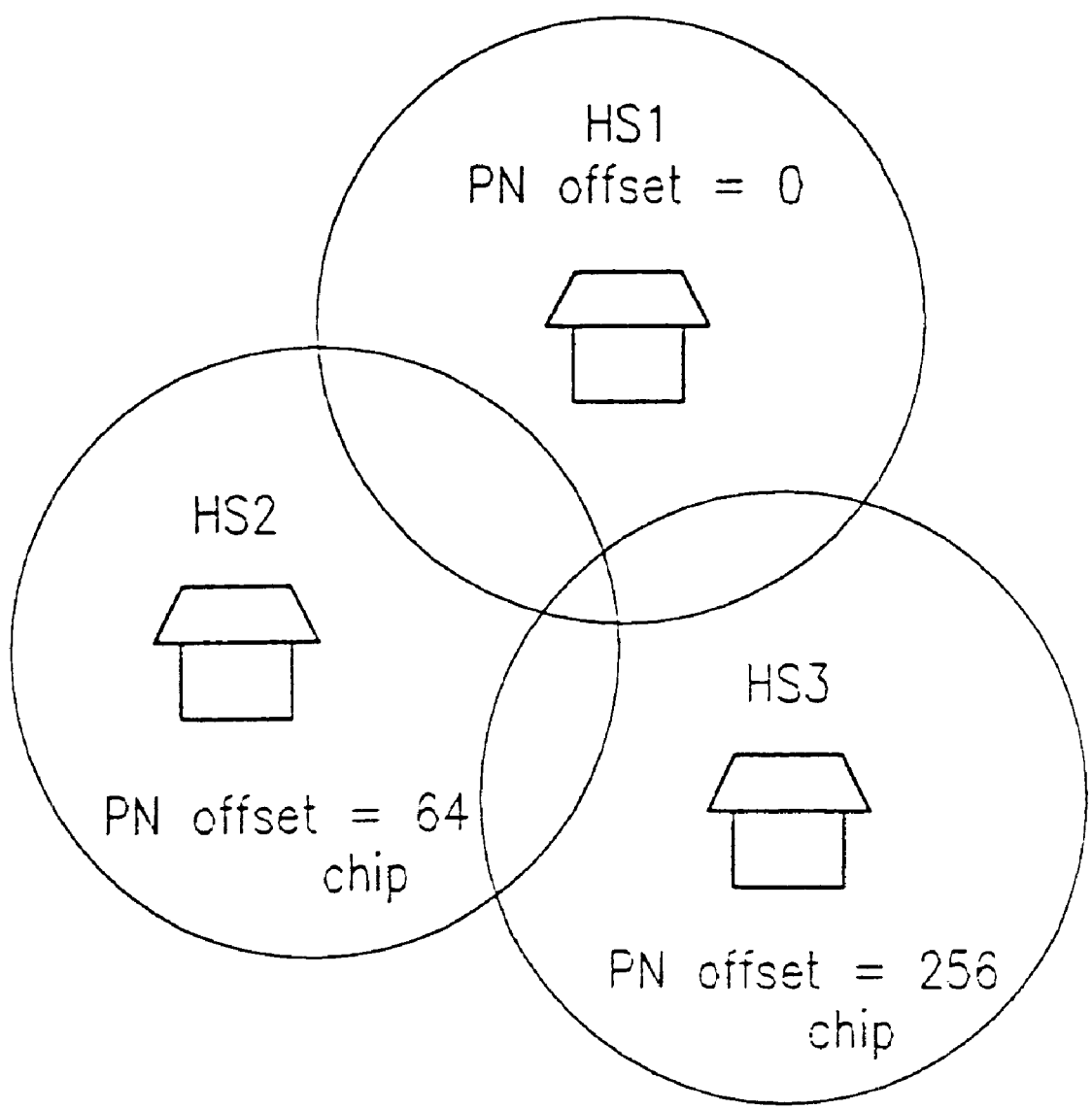
FIG. 1B illustrates an assignment of pilot channel PN offsets in a background art cordless telephone system.
Figure 2:
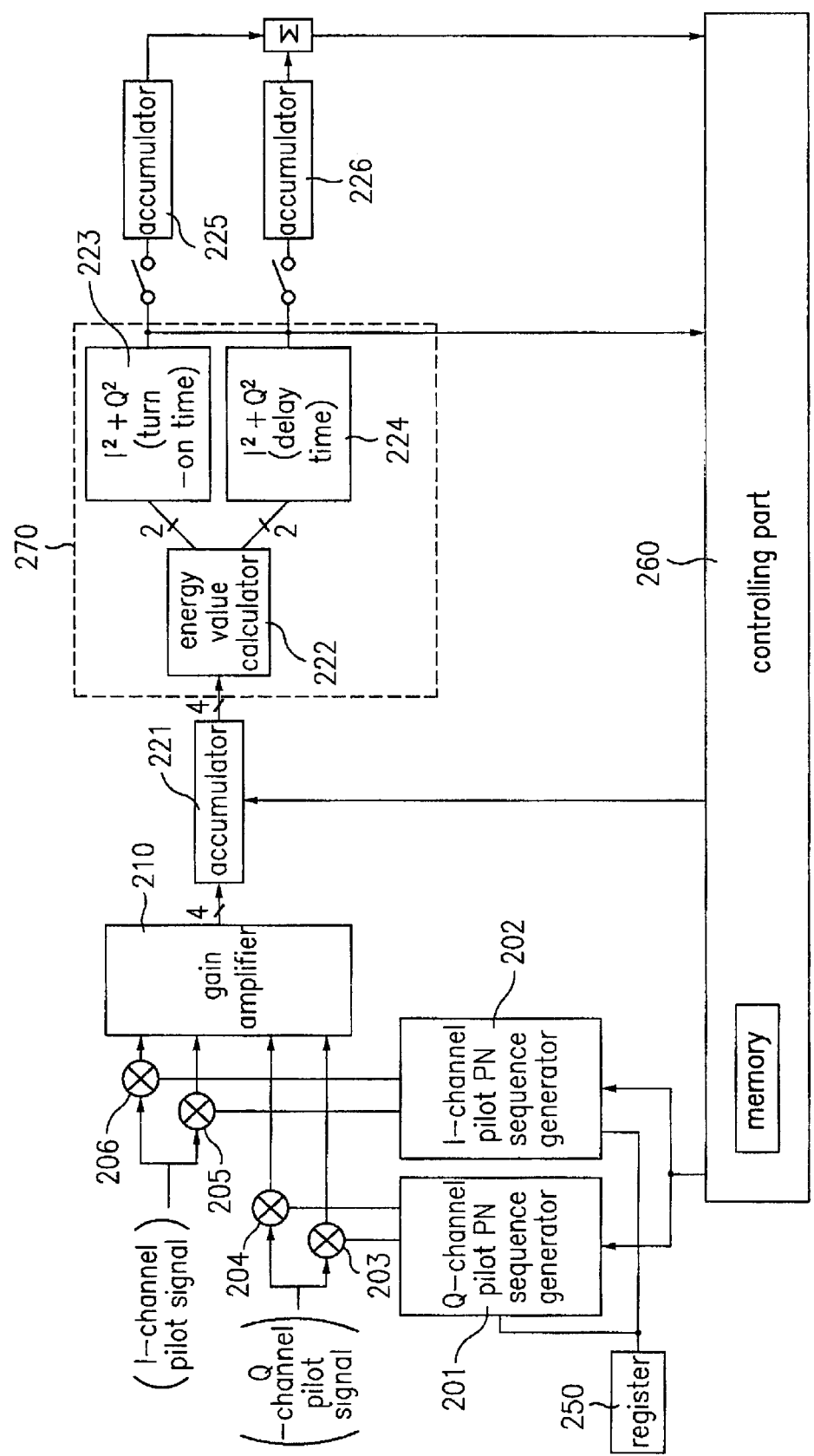
FIG. 2 illustrates a block diagram of a device for detecting a pilot PN offset in a cordless telephone system in accordance with a preferred embodiment of the present invention.

Reference will now be made in detail to the preferred embodiments of the present invention, examples of which are illustrated in .the accompanying drawings. FIG. 2 illustrates a block diagram of a device for detecting a pilot PN offset in a cordless telephone system in accordance with a preferred embodiment of the present invention.

Referring to FIG. 2, the device for detecting a pilot PN offset in a cordless telephone system in accordance with a preferred embodiment of the present invention is preferably provided in a home station of a cordless telephone system, and preferably includes pilot PN sequence generators for Q and I channels 201 and 202 each receiving an initial value from the register 250 and generating a pilot PN sequence for tracking a synchronization of a pilot channel signal, multipliers 203,204,205 and 206 each for spreading the pilot PN sequence from the pilot PN sequence generators 201 and 202 and channel data signals provided from cordless telephones within a service radius to one another. A gain-amplifer 210 is for taking a gain of data streams of the I and Q channels correlation detected through the multipliers 203,204,205 and 206, and an accumulator 221 is for accumulating the data streams of the I and Q pilot channels provided from the gain-amplifier 210 for a certain period. An energy value calculating part 270 calculates an energy value of a signal from the accumulator 221 for turned on time and delayed time, and a storage region stores at least one different pilot PN offsets detected within a preset service region and threshold values of I, Q energies. It is noted that the device may include both a register 250 and a controlling part 260 having a storage area for storing at least one different pilot PN offset and threshold energy values. A controlling part 260 is for determining different pilot PN offsets existing in an overlapped service region using the stored The operation of the aforementioned device for detecting a pilot PN offset in a cordless telephone system of the present invention will be explained.

The operation of the pilot PN offset detecting device of the present invention is only performed in case that the power is provided or entire device is reset.

First, PN sequences provided from the I, Q channel PN sequence generators 202 and 201 to have particular reference offsets and I, Q pilot data signals provided from nearby home stations in other cordless telephone system are spread through the multipliers 203,204,205 and 206, and correlations of pilot PN channel data streams obtained from the spread are calculated. Then, the I, Q pilot channel data streams are demodulated and provided to a synchronous integration circuit (not shown) to obtain certain gains through the gain amplifier 210 and are accumulated in the accumulator 221 for a certain time period (a particular window size=n chip time). The energy value calculator 222 squares the accumulated data values to obtain energy values $I^2+Q^2$ for turned on value and delayed value, respectively, and provides this value to energy value calculators 223, 224. Specifically, the energy value calculator 222 converts the initial synchronous signal (I or Q) accumulated for a prescribed period of time at the accumulator into an energy value. This energy value is a square of the size of the initial synchronous signal (I or Q). Data accumulated at the accumulator is obtained as an energy value $I^2+Q^2$ at both an initialization (turn-on) time and a delayed time at the energy value calculator 222. The initial time calculation is transmitted to element 223, and the delayed calculation is transmitted to element 224. In the preferred embodiment, the energy values transmitted to each of elements 223 and 224 are identical.

Next, the switches between elements 223, 224 and 225, 226, respectively, are used for providing the energy value from the accumulator 225, 226 to an asynchronous integrator at a given point in time delayed by one chip. The switches preferably operate under the control of the controlling part 260.

Energy values obtained thus are compared to a preset initial threshold value Vn in the controlling part 260. If the obtained energy value exceeds the initial threshold value, the obtained energy value is applied to an asynchronous integration circuit (not shown), an accumulation time period (window size) of the accumulators 225 and 226 is reduced for a more precise detection, and a synchronous integration operation is conducted. On the other hand, if the obtained energy value does not exceed the initial threshold value Vn, reference offsets of the I, Q PN sequence generators 201 and 202 are increased (an increase of a code phase by one chip), and the synchronous integration operations are repeated. Upon completion of detection of phases of all PN sequences in the window, a detection end signal is provided to the I, Q PN sequence generators 201 and 202, to inform the controlling part 260, subsequently. When it is determined that the initial threshold values are passed n times, the controlling part 260 compares an energy value of a sum of the turned on time and delay time accumulated in the asynchronous integration circuit to a threshold value Vtn with which a presence of the PN offset provided from other cordless telephone system is determined. When the energy value exceeds the Vtn, a pilot PN offset and its energy value at this time are stored in the storage area of the controlling part 260. Then, the controlling part 260 reads on the stored value and constructs a database using information of PN offsets assigned to cordless telephone systems around its own service region. Alternatively, the construction of the database could be performed simultaneously with storing the values in the storage area by constructing it directly from the PN offset and power information that is being stored. On the other hand, if the energy value is below Vtn, the reference offset is increased, and the aforementioned steps are repeated in sequence. Alternatively, a threshold value could be set for each pilot PN offset. The controlling part 260 selects a pilot PN offset having adjacent PN offsets which are distanced far enough apart and have low energies based on the database using the pilot PN offsets and their energy values provided from a nearby cordless telephone system, updates code phases of the pilot PN sequence generators 201 and 202 with the pilot PN offset to slew the pilot PN sequence generators 201 and 202, and controls the pilot PN sequence generators 201 and 202 to generate pilot channel signals, continuously.

Figure 3:
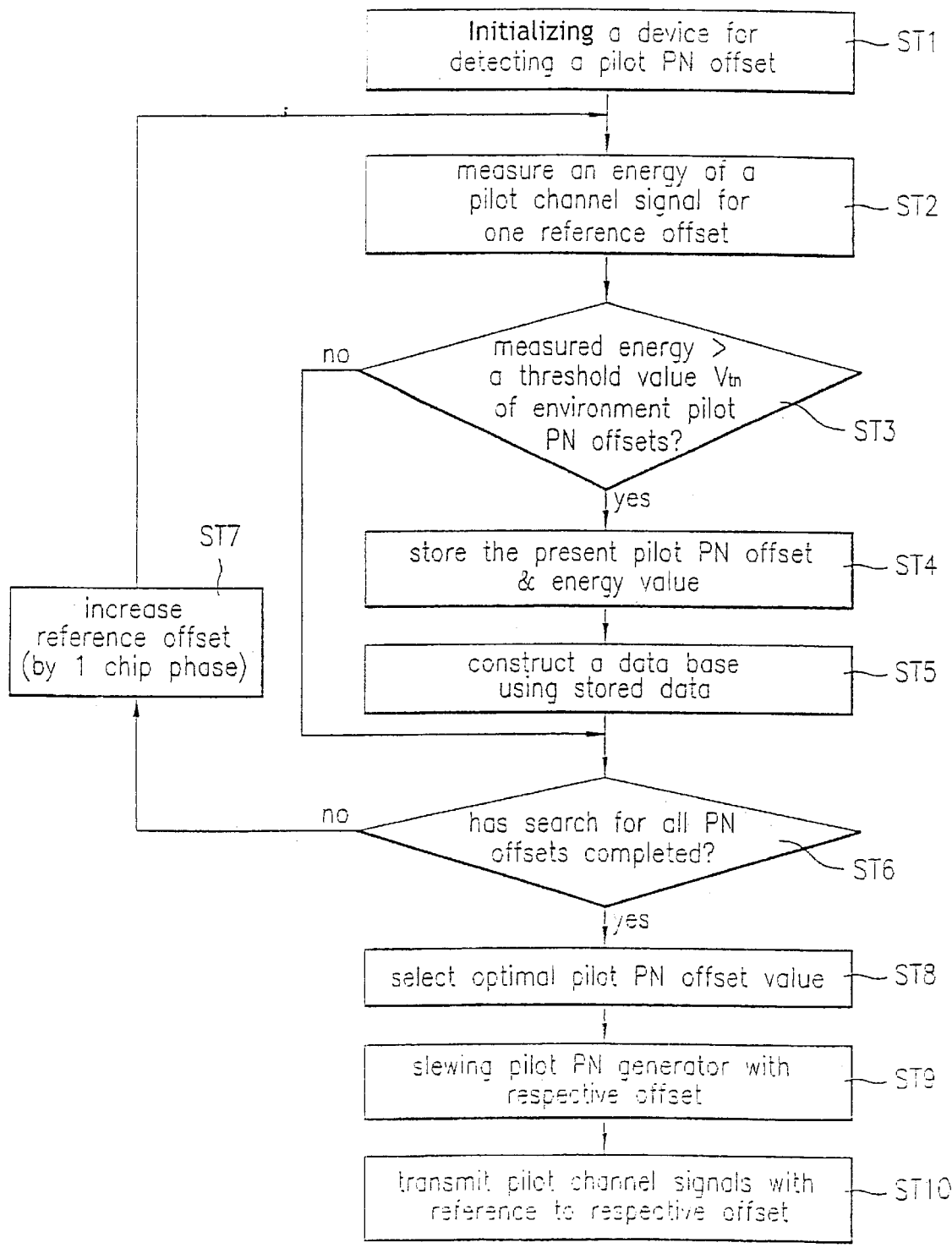
FIG. 3 illustrates a flow chart for explaining the steps of a process for detecting a pilot PN offset in a cordless telephone system in accordance with a preferred embodiment of the present invention.

FIG. 3 illustrates a flow chart for explaining the steps of a process for detecting a pilot PN offset in a cordless telephone system in accordance with a preferred embodiment of the present invention.

Referring to FIG. 3, upon supply of an initial power to, or resetting a device for detecting a pilot PN offset in a cordless telephone system in accordance with a preferred embodiment of the present invention, a controlling part 260 initializes a storage region (sometimes referred to as a storage area of a memory region) in which PN offset values and their energy values of other home stations within the service region of the home station of the present invention can be stored (ST1). Alternatively, the memory region could not be initialized on reset or initialized at a prescribed time interval. For example, in one embodiment, the memory region is not initialized when power is supplied to the system subsequent to an interruption of power for a prescribed period of time. An energy of a pilot channel signal for one reference offset is measured (ST2), and the measured energy value and a threshold value of an energy of another pilot offset, which is provided from another home station within the service region of the home station of the present invention, are compared (ST3). In this step (ST3), if the measured energy exceeds the threshold value for a pilot PN offset, the present pilot PN offset and its energy value is stored in a storage area (ST4). Then, the controlling part 260 constructs a database using the stored value in a storage area of the controlling part 260 (ST5). The controlling part 260 determines whether search for all pilot PN offsets within the service region of the home station of the present invention has been completed (ST6). However, if it is determined that the measured energy is lower than a preset initial threshold value in the determining step (ST3), the process proceeds to the aforementioned determining step (ST6), directly. In this instance, if all the search is not completed in the determining step (ST6), the steps (ST2 to ST5) is repeated after an increase of the reference offset by one chip phase (ST7). If the search for all PN offsets is completed in the determining step (ST6), an optimal pilot PN offset value that is not included in the database is selected (ST8). In the selection of an optimal pilot PN offset, priorities are given to pilot PN offsets according to states of the pilot PN offsets which are not included in the database, and a pilot PN offset having the best state in this priority is selected as the optimal pilot PN offset. Then, the pilot PN sequence generators 201 and 202 are slewed with the optimal pilot PN offset (ST9), and pilot channel signals are provided continuously based on the optimal pilot PN offset (ST10).

The handset of a cordless telephone system of the present invention makes all telephone communication through a home station in the cordless telephone system when the subscriber is within a service range of the cordless telephone system while the subscriber uses the handset as a mobile station of a cellular mobile communication system when the subscriber is out of the service range. Therefore, a device for charging the mobile station is not required separately, and the handset can use both a public switching telephone network and a cellular mobile communication network.

It will be apparent to those skilled in the art that various modifications and variations can be made in the device and method for detecting a pilot PN offset in a cordless telephone system of the present invention without departing from the spirit or scope of the invention. Thus, it is intended that the present invention cover the modifications and variations of this invention provided they come within the scope of the appended claims and their equivalents.

What is claimed is:

1. A device for detecting a pilot PN offset in a cordless telephone system, comprising:
    pilot PN sequence generators each for generating a pilot PN sequence for tracking a synchronization of a pilot channel signal;
    despreaders for despreading the pilot PN sequences provided from the pilot PN sequence generators and channel data signals detected within an overlapped service radius;
    an accumulator for accumulating data streams of pilot channels provided from the despreaders for a certain period;
    an energy value calculator for calculating an energy value of a signal from the accumulator;
    a storage region for storing at least one different pilot PN offset detected within a set service region and threshold energy values; and
    a controlling part for determining different pilot PN offsets existing in an overlapped service region using the pilot PN offsets stored in the storage region and energy values of the pilot PN offsets, and for detecting a pilot PN offset not in use.

2. A device as claimed in claim 1, wherein the storage region comprises at least one register and storage area, respectively.

3. A device as claimed in claim 1, which is operative in cases when a power is supplied thereto initially or resets the device completely.

4. The device of claim 1, wherein the controlling part is configured to construct a database of existing PN offsets and corresponding energy values.

5. The device of claim 1, wherein a detected PN offset and a corresponding energy value are stored in the storage region if the controlling part determines that the energy value of the detected PN offset exceeds a prescribed value.

6. The device of claim 5, wherein the controlling part constructs a database of all PN offsets and corresponding energy values that exceed the prescribed value.

7. The device of claim 6, wherein the prescribed value is a threshold energy value.

8. The device of claim 1, wherein the accumulator is coupled to receive a feedback signal directly from the controlling part.

9. The device of claim 1, wherein an accumulation time period of the accumulator is reduced if the energy value exceeds a threshold energy value.

10. A method for detecting a pilot PN offset in a cordless telephone system, comprising:

initializing a memory region;

measuring an energy value of a first pilot PN offset for at least one first pilot channel signal;

comparing the measured energy value of the first pilot PN offset for the at least one first pilot channel signal to a threshold energy value of a second pilot PN offset provided within an overlapped service radius in a prescribed sequence;

constructing a database using the first pilot PN offset for the at least one first pilot channel signal and the measured energy value of the first pilot PN offset when the measured energy value exceeds the threshold energy value of the second pilot PN offset; and selecting the first pilot PN offset for one of the at least one first pilot channel signals which is not included in the database.

11. The method as claimed in claim 10, wherein the memory region is initialized by supplying a power initially or resetting the system.

12. The method as claimed in claim 10, wherein the memory region is not initialized when power is supplied to the system subsequent to an interruption of power for a prescribed period of time.

13. The method as claimed in claim 10, wherein constructing the database comprises:

sequentially storing resultants of the comparing step, and constructing the database using the resultants of the comparing step.

14. The method as claimed in claim 13, wherein the resultants of the comparing step are used for directly constructing the database, and wherein constructing the database is performed at the same time as storing the resultants.

15. The method of claim 13, wherein the database is constructed after the resultants are stored.

16. The method as claimed in claim 10, wherein selecting the first pilot PN offset for one of the at least one first pilot channel signals comprises:

giving priorities to detected pilot PN offsets which are not included in the database according to states of other detected pilot PN offsets which are not included in the database; and selecting a prioritized detected pilot PN offset of a best state in the priorities.

17. The method as claimed in claim 10, further comprising transmitting pilot channel signals continuously for despreading based on the selected pilot PN offset.

18. A cordless telephone system, comprising:

a handset; and a base, wherein the base comprises, a pilot PN sequence generator for generating a pilot PN sequence for tracking a synchronization of a pilot channel signal, a despreader for despreading the pilot PN sequence provided from the pilot PN sequence generator and channel data signals detected within an overlapped service radius, an accumulator for accumulating data streams of pilot channels provided from the despreader for a certain period, an energy value calculator for calculating an energy value of a signal from the accumulator, and a controlling part for determining a plurality of pilot PN offsets existing in an overlapped service region and corresponding energy values of the pilot PN offsets, and detecting a pilot PN offset not in use by comparison of the corresponding energy values to a threshold value.

19. The system of claim 18, wherein the threshold value is one of a measured value for each corresponding energy value of the pilot PN offsets and a prescribed value.

20. The system of claim 18, wherein the controlling part provides an optimal pilot channel signal when more than one of the plurality of pilot PN offset not in use are detected.

21. A method for operating a cordless telephone system, comprising:

obtaining a plurality of pilot PN offsets within an overlapped service radius;

comparing a measured enery value of each of the plurality of pilot PN offsets to a threshold energy value of the pilot PN offsets in a predetermined sequence;

constructing a database using a present pilot PN offset and an energy value of the present pilot PN offset when the measured energy value exceeds the threshold energy vaule of the present pilot PN offset; and selecting one of the pilot PN offsets which is not included in the database.

22. The method of claim 21, wherein the cordless telephone system comprises a handset, and wherein the handset is configured to establish a comunication link with one of a PSTN and a cellular mobile communication network.

* * * * *